United States Patent
Laborde et al.

(10) Patent No.: US 10,094,912 B2
(45) Date of Patent: Oct. 9, 2018

(54) OPERATOR TERMINAL WITH DISPLAY OF ZONES OF PICTURE TAKING QUALITY

(71) Applicant: THALES, Neuilly sur Seine (FR)

(72) Inventors: Pierre Laborde, Brest (FR); Eric Le Pors, Brest (FR)

(73) Assignee: THALES, Neuilly sur Seine (FR)

( * ) Notice: Subject to any disclaimer, the term of this patent is extended or adjusted under 35 U.S.C. 154(b) by 255 days.

(21) Appl. No.: 15/033,528

(22) PCT Filed: Oct. 30, 2014

(86) PCT No.: PCT/EP2014/073294
§ 371 (c)(1),
(2) Date: Apr. 29, 2016

(87) PCT Pub. No.: WO2015/063198
PCT Pub. Date: May 7, 2015

(65) Prior Publication Data
US 2016/0266237 A1   Sep. 15, 2016

(30) Foreign Application Priority Data
Oct. 30, 2013   (FR) .................................... 13 02517

(51) Int. Cl.
*G01S 13/89* (2006.01)
*G01S 7/24* (2006.01)
(Continued)

(52) U.S. Cl.
CPC ............... *G01S 7/24* (2013.01); *G01C 23/00* (2013.01); *G01S 13/865* (2013.01); *G01S 13/867* (2013.01); *G01S 13/89* (2013.01)

(58) Field of Classification Search
CPC ..... G01S 7/04; G01S 7/06; G01S 7/22; G01S 7/24; G01S 13/89; G01S 13/86;
(Continued)

(56) References Cited

U.S. PATENT DOCUMENTS 4,623,966 A * 11/1986 O'Sullivan ............... G01S 7/22
342/182
5,012,251 A *  4/1991 Kennedy ................. G01S 7/026
342/173
(Continued)

OTHER PUBLICATIONS

Baker et al., "Advanced Integrated Multi-sensor Surveillance (AIMS) Operator Machine Interface (OMI) Definition Study", DRDC Atlantic Contract Scientific Authority, Feb. 2007, pp. 635-2189.) (Year: 2007).*
(Continued)

*Primary Examiner* — Peter M Bythrow
(74) *Attorney, Agent, or Firm* — Thompson Coburn LLP; Steven M. Ritchey

(57) ABSTRACT

An operator terminal of a mission system including at least one screen for displaying environmental data of a mobile carrier of a situation analysis system including at least one image sensor and a real-time spatial position of at least one object of interest. This operator terminal includes a module for obtaining at least one piece of position information representative of the position of the carrier and at least one object of interest. A computing module providing at least two different picture taking quality zones, in a predetermined spatial perimeter centered on the position of the carrier. This operator terminal also includes a module for displaying a map of said picture taking quality zones relative to the position of the carrier. The obtaining, computing and display modules are implemented to obtain a quasi-real-time refresh of said displayed map.

11 Claims, 4 Drawing Sheets

(51) Int. Cl.
*G01C 23/00* (2006.01)
*G01S 13/86* (2006.01)

(58) Field of Classification Search
CPC ..... G01S 13/865; G01S 13/867; G01C 23/00; G01C 23/005
See application file for complete search history.

(56) References Cited

U.S. PATENT DOCUMENTS

| | | | | |
|---|---|---|---|---|
| 5,337,057 | A * | 8/1994 | Michie | G01S 7/12 342/176 |
| 6,212,471 | B1 * | 4/2001 | Stiles | G01S 13/88 342/158 |
| 6,549,161 | B1 * | 4/2003 | Woodell | G01S 13/426 342/26 R |
| 7,363,156 | B2 * | 4/2008 | Winkler | G01C 23/005 701/3 |
| 7,411,196 | B2 * | 8/2008 | Kalayeh | G01C 11/025 250/342 |
| 7,777,647 | B2 * | 8/2010 | Sallier | G01C 23/005 340/973 |
| 9,002,638 | B2 * | 4/2015 | Safoutin | G01C 21/3682 701/420 |
| 2002/0149599 | A1 * | 10/2002 | Dwyer | G01C 23/00 345/592 |
| 2009/0002220 | A1 * | 1/2009 | Lovberg | G01S 13/89 342/33 |
| 2009/0327273 | A1 * | 12/2009 | Aung | G01C 23/00 |
| 2011/0299734 | A1 | 12/2011 | Bodenmueller | |
| 2012/0176410 | A1 * | 7/2012 | Meier | G06F 3/011 345/633 |
| 2013/0286022 | A1 * | 10/2013 | Kubota | G01S 7/10 345/440 |
| 2015/0073696 | A1 * | 3/2015 | Servantie | G01C 23/00 701/409 |
| 2015/0211883 | A1 * | 7/2015 | He | G05D 1/0858 340/946 |
| 2017/0003388 | A1 * | 1/2017 | Palmer-Smith | G01S 13/89 |

OTHER PUBLICATIONS

Baker et al., "Advanced Integrated Multi-sensor Surveillance (AIMS) Operator Machine Interface (OMI) Definition Study", DRDC Atlantic Contract Scientific Authority, Feb. 2007, pp. 635-2189.
International Search Report for FR 1302517 dated May 22, 2014.
International Search Report for PCT/EP2014/073294 dated Feb. 4, 2015.

* cited by examiner

OPERATOR TERMINAL WITH DISPLAY OF ZONES OF PICTURE TAKING QUALITY

CROSS-REFERENCE TO RELATED APPLICATIONS

This application is a U.S. National Phase application of PCT/EP2014/073294, filed on Oct. 30, 2014, claiming the benefit of FR Application No. 13 02517, filed Oct. 30, 2013, both of which are incorporated herein by reference in their entireties.

BACKGROUND OF THE INVENTION

The present invention relates to an operator terminal of a mission system including at least one screen for displaying environmental data of a mobile carrier of a situation analysis system, said analysis system including at least one image sensor and means for providing a real-time spatial position of at least one object of interest.

The invention falls within the field of man-machine interaction methods, adapted for configuring mission systems.

A mission system allows one or more operators to carry out a given mission, for example an environment surveillance, reconnaissance or combat mission, using a situation analysis system including various sensors (e.g., radars, cameras, detectors) and/or effectors (e.g., scramblers, decoys). The mission system aggregates information provided by the various sensors, to provide a synthesized vision to the operator, via a man-machine interface (MMI). Furthermore, the operator is led to adjust a set of parameters relative to the sensors and/or effectors and to command the operation of the sensors via the man-machine interface.

Such mission systems are in particular intended to be onboard a mobile carrier (e.g., aircraft, land vehicle, vessel). During reconnaissance or intervention missions, it is useful to acquire images of objects of interest being observed, for example boats, trucks or airplanes, using onboard sensors of the situation analysis system. In general, a situation analysis system includes several picture taking sensors, or sensors able to operate in different picture taking modes.

For example, one type of sensor used is an infrared electro-optical camera, known under the name "forward-looking infrared" (FLIR). It is also possible to generate images of objects of interest by using a radar sensor, in several modes, for example "synthetic aperture radar" (SAR) or "inverse synthetic aperture radar" (ISAR).

A mission system operator is brought to select the appropriate image taking sensor or the appropriate image taking mode to obtain a satisfactory image of an object of interest, under difficult conditions, the carrier and the object of interest potentially being in motion. Furthermore, the operator must account for environmental conditions (visibility, shaking of the carrier) to select an appropriate picture taking moment to obtain a usable image of the object of interest.

Traditionally, it is provided to display indications relative to all of the sensors and the picture taking modes available on board the carrier, in the form of a display table, optionally accompanied by an indication of an "active" or "unavailable" status. Although such indications help an operator, they are insufficient, inasmuch as the carrier and the object of interest are in motion. Thus, an operator can trigger picture taking by a selected sensor just before that picture taking is no longer possible, for example because the object of interest is outside the capture field of the selected sensor.

SUMMARY OF THE INVENTION

To that end, according to a first aspect, the invention proposes an operator terminal of a mission system including at least one screen for displaying environmental data of a moving carrier of a situation analysis system, said analysis system including at least one image sensor and means for the real-time provision of the spatial position of at least one object of interest. The operator terminal includes:
  a module for obtaining at least one piece of position information representative of the position of the carrier and of said at least one object of interest,
  for at least one picture taking mode using a selected image sensor, a computing module able to provide at least two different picture taking quality zones, in a predetermined spatial perimeter centered on the position of the carrier, each picture taking quality zone having an associated quality level, and
  a module for displaying a map of said picture taking quality zones relative to the position of the carrier, in the predetermined spatial perimeter,
said obtaining, computing and display modules being implemented to obtain a quasi-real-time refresh of said displayed map.

Advantageously, the display of a map of the picture taking quality zones for one or more sensors, refreshed substantially in real-time, greatly facilitates the taking of usable images, even under usage conditions in a restricted environment.

The operator terminal according to the invention can also have one or more of the features below, considered independently or in combination.

The image sensor(s) are able to acquire images according to a plurality of picture taking modes, and the picture taking quality zone computing module is implemented for each of the picture taking modes, and the display module is able to display, on the same display screen, all of the picture taking quality zones relative to each of said picture taking modes.

The operator terminal includes, for each picture taking mode, picture taking control zones by the operator and automatic picture taking control zones, selectable by the operator and displayed on the same display screen as said map.

The display module is further able to display a visual indication relative to the position of the carrier with respect to the relative position of the object of interest.

The computing module is able to determine at least one picture taking quality zone having a nominal quality level and at least one picture taking quality zone having a deteriorated quality level.

The map shows said object of interest at a constant distance from the carrier, and the display module is able to display actual distance information between the carrier and the object of interest.

The display module is able to display a distance remaining to be traveled by the carrier to reach a nominal picture taking quality zone according to a predetermined acquisition mode.

The displayed picture taking quality zones are repositioned in the predetermined spatial perimeter substantially in real-time based on the actual distance and the relative orientations between the carrier and the object of interest.

The picture taking quality zones are displayed in the form of concentric ring portions, fitted in a circular perimeter centered on the object of interest and limited by an outer circle, the situation of the concentric rings relative to the outer circle indicating whether the carrier is situated at a sufficient distance from the object of interest to reach a corresponding quality zone.

The module for obtaining at least one piece of position information makes it possible to obtain a distance between the carrier and the object of interest and a relative rotation angle between the object of interest and the carrier.

The computing module takes outside environment conditions of the carrier and/or the object of interest into account to determine the picture taking quality zones.

According to a second aspect, the invention relates to a mission system including at least one display screen displaying environmental data of a moving carrier of a situation analysis system, said analysis system including at least one image sensor and means for the real-time provision of a spatial position of at least one object of interest. This mission system includes an operator terminal as briefly described above.

BRIEF DESCRIPTION OF THE DRAWINGS

Other features and advantages of the invention will emerge from the description thereof provided below, for information and non-limitingly, in reference to the appended figures, in which.

DETAILED DESCRIPTION OF PREFERRED EMBODIMENTS

The invention will be described below in an embodiment in which the operator terminal is onboard a mobile carrier of the aircraft, land vehicle or naval platform type, equipped with a situation analysis system including a plurality of picture taking sensors, also called image sensors.

Figure 1:
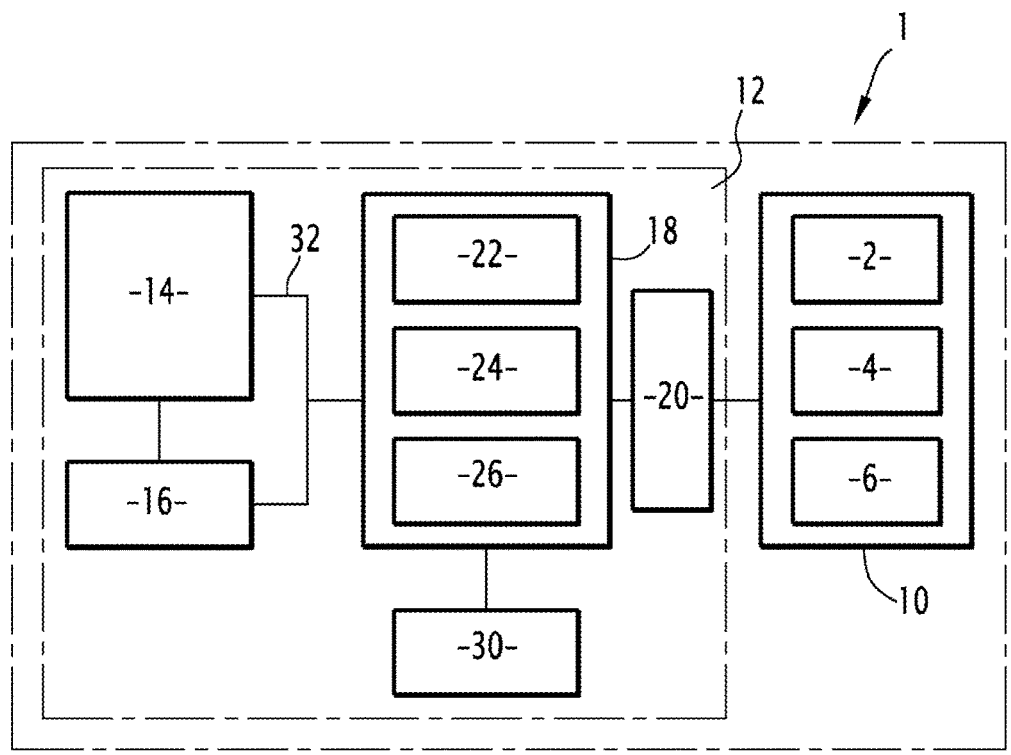
FIG. 1 is a diagrammatic illustration of the modules of a mission system according to one embodiment of the invention.

One example of a mission system 1 according to the invention is diagrammatically illustrated in FIG. 1.

This mission system 1 includes a first picture taking sensor 2 and a second picture taking system 4, and a detector 6 for detecting the position of objects or targets to be monitored (not shown in the figure).

For example, the first sensor 2 is an infrared sensor of the FLIR type and the second sensor 4 is a radar sensor able to operate in SAR mode and/or ISAR mode.

The sensors 2, 4 and the detector 6 are part of a situation analysis system 10 onboard an aircraft-type carrier (not shown in the figure).

In a typical usage scenario, the carrier and the object(s) of interest are in motion.

The mission system 1 also includes an operator terminal 12, which can either be onboard the carrier, or situated in a ground control center.

The operator terminal 12 comprises one or more display screens 14, preferably tactile, and a module 16 for entering commands from an operator, which is for example a tactile command entry module, making it possible to select graphic elements displayed on the screen 14, a central processing unit 18, or CPU, able to execute computer program instructions when the terminal 12 is powered on.

A communication interface 20 makes it possible to collect information from the situation analysis system 10 and provide commands to the situation analysis system 10.

The central processing unit 18 implements a module 22 for obtaining at least one piece of position information representative of the position of the carrier with respect to an object of interest, a module 24 for computing separate picture taking quality zones with respect to the picture taking modes of the image sensors 2, 4. Each picture taking quality zone has an associated quality level.

Such position information typically comprises the distance between the carrier and the object of interest, the relative bearing, the azimuth of each one, a relative rotation angle between the carrier and the object of interest.

Furthermore, the central processing unit 18 implements a module 26 for displaying a map of the picture taking quality zones relative to the position of the carrier, in a predetermined spatial perimeter, as explained in more detail below in reference to FIGS. 2 to 6.

The terminal 12 also includes information storage means 30, for example registers, able to store executable code instructions and values of parameters for implementing programs including code instructions able to implement the display of picture taking quality zone maps according to the invention.

The various functional blocks of the terminal 12 described above are connected via a communication bus 32.

Figure 2:
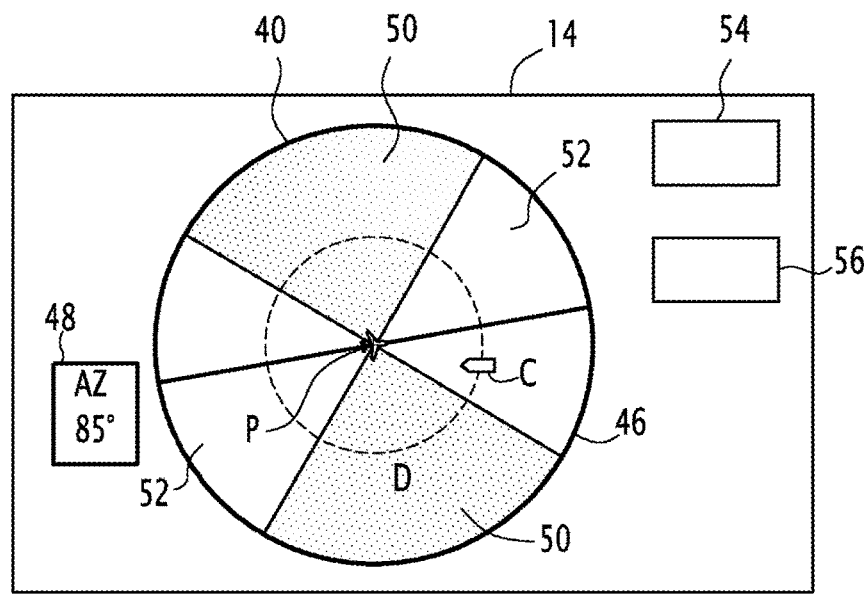
FIG. 2 is an illustration of a display the relative to a picture taking mode according to a first embodiment of the invention.

FIG. 2 illustrates a map 40 representative of the picture taking quality associated with a given image sensor and a given picture taking mode, selected beforehand by the user, and for an object of interest selected beforehand, displayed on a man-machine interface of the display screen 14. For example, the image sensor 4 working in SAR picture taking mode is selected.

Alternatively, the map 40 representative of the picture taking quality is displayed on a portion of one of the display screens of the operator terminal 12.

The map 40 is refreshed in real-time, depending on the position of the carrier P and the object of interest C. As illustrated in FIG. 2, the selected representation is a circular representation centered on the carrier P. Preferably, the representation is done in a circular perimeter 46 having a fixed size on the display screen, and the object of interest C is shown at a constant distance from the carrier P in this perimeter 46. The actual distance D between the carrier P and the object of interest C is indicated to the operator and refreshed in real-time.

The man-machine interface also includes an indication 48 relative to the trajectory of the carrier, for example its azimuth (denoted AZ), which is 85° in the example of FIG. 2.

The perimeter 46 is partitioned by picture taking quality zones 50, 52, each having an associated picture taking quality level. The quality level is indicated visually using a predetermined visual indicator, easily intelligible by the operator, the visual indicator for example being embodied by a color or an associated fill texture. Thus, the zones denoted 50 correspond to a first nominal quality level, which is a satisfactory quality level, average to good, and the zones denoted 52 correspond to a deteriorated picture taking, with a second quality level well below the first quality level.

Thus, in the example of FIG. 2, the object of interest C is in the zone 52 in which the picture taking by the sensor 2 is deteriorated, therefore not recommended.

Advantageously, the operator can easily decide whether the selected sensor is usable, owing to the map 40 using picture taking quality zones. Furthermore, owing to all of the information displayed in the real-time refresh of the display information, he can effectively modify the trajectory of the carrier P to take the picture with the selected sensor.

Furthermore, the man-machine interface includes graphic objects 54, 56 that can be selected, for example by clicking or by pressure from the operator's finger on the touchscreen, making it possible to select one of the sensors or one of the available picture taking modes. For example, the graphic object 54 makes it possible to select the sensor 2 and the graphic object 56 makes it possible to select the sensor 4.

Thus, in the embodiment of FIG. 2, the picture taking evaluation for each sensor/picture taking mode can be done successively.

Figure 3:
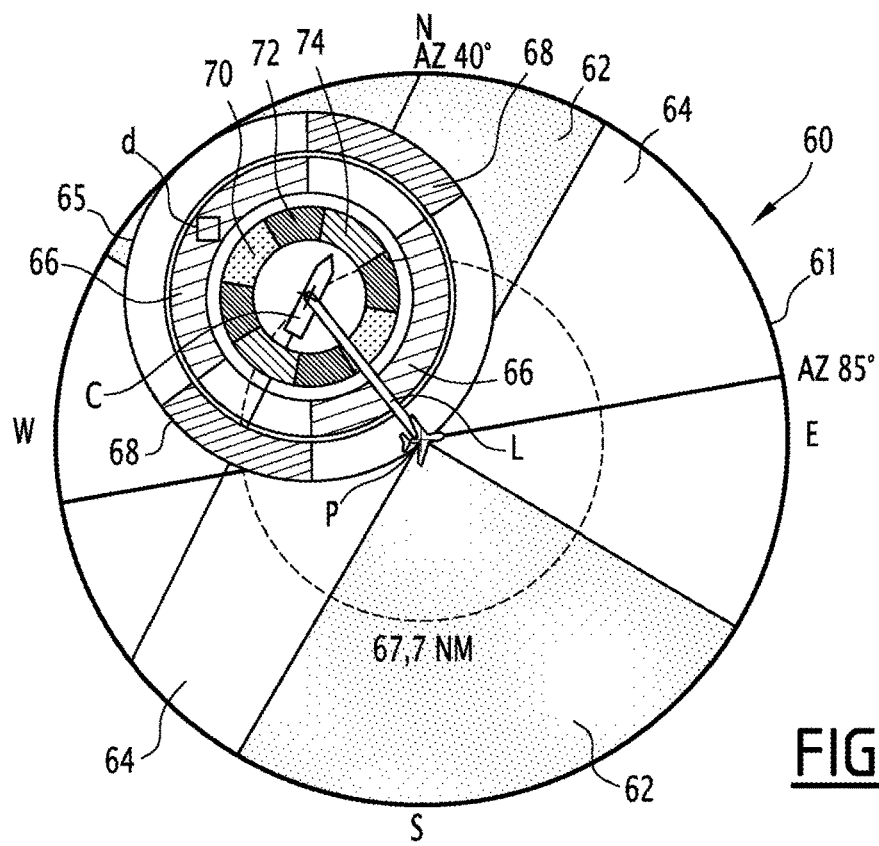
FIG. 3 is an illustration of a display view relative to a plurality of picture taking modes according to a second embodiment of the invention.

According to a second embodiment illustrated in FIG. 3, the spatial picture taking zones of each of the available sensors are displayed superimposed on a same map 60, in a same depiction perimeter 61.

The perimeter 61 therefore contains the map 60, refreshed in real-time, of the picture taking quality zones associated with several sensors.

The carrier P is at the center of the perimeter 61, and the object of interest C is situated at a distance D from the carrier P, D=67.7 nautical miles (NM) in this example. In the graphic representation, the perimeter 61 and the distance between the carrier P and the object of interest C are standardized. Advantageously, such a standardized illustration facilitates the operator's comprehension.

The carrier P and the object of interest C are connected by a line of sight L.

In the example of FIG. 3, the cardinal points North (N), South (S), East (E) and West (W) are indicated, as well as the azimuths of the respective trajectories of the carrier P and the object of interest C.

Furthermore, the respective orientations of the carrier P and the object of interest C are displayed. Alternatively, the value of the relative rotation angle between the carrier P and the object of interest C, formed between the longitudinal axis of the carrier P and the longitudinal axis of the object of interest C, is also displayed.

In the example of FIG. 3, the map 60 indicates, superimposed, the picture taking quality zones associated with the sensors present in four different picture taking modes, namely: SPOT-SAR, SAR, DRP (Dynamic Range Profile) and FLIR.

It should be noted a same onboard sensor can perform several picture taking modes, for example the SAR and DRP modes.

The displayed map 60 comprises an indication of the zones 62, 64 associated with a first sensor, according to a first picture taking mode, which in this example is the SPOT-SAR mode. The zones 62, 64 are determined by the computing module 24, in a manner known itself, based on the orientation of the carrier P, independently of the orientation of the object of interest C.

Furthermore, for other image acquisition modes, the picture taking quality evaluation, and therefore the computation of the associated quality spatial zones, also takes into account the relative position of the carrier with respect to the object of interest.

Advantageously, the spatial quality zones are shown in the form of concentric ring portions, the center of which is the object of interest C, contained in a perimeter defined by an outer circle 65 with a radius equal to the representation distance in the map 60 between the carrier P and the object of interest C, so as to facilitate the cartographical representation for several considered acquisition modes.

The circular perimeter defined by the circle 65 comprises all of the picture taking quality zones associated with the acquisition modes for which the picture taking quality also depends on the relative position of the carrier with respect to the object of interest.

Owing to this depiction, the operator can easily analyze the situation of the different image acquisition modes and the associated picture taking qualities.

Preferably, the positioning distance of the rings or concentric ring portions with respect to the center C of the outer circle 65 is defined as a function of the range of the sensor taking pictures of the corresponding acquisition mode. Thus, preferably, the rings/ring portions closest to the outer circle 65 correspond to the image acquisition mode with the largest range.

In the example of FIG. 3, the zones 66 correspond to a nominal picture taking quality by a second sensor of the radar type according to a second SAR image picture taking mode.

For this second picture taking mode, the orientation of the object of interest, the orientation of the carrier and the distance between the carrier and the object of interest make it possible to determine the feasibility of the image acquisition.

In the example of FIG. 3, the line of sight L intersects the nominal picture taking zones 66 with the second sensor according to the second picture taking mode, which means that the orientation of the carrier P relative to the object of interest C is good for this second picture taking mode.

If the distance between the carrier P and the object of interest C is insufficient, a visual indication is displayed to alert the operator.

For example, a distance value d is indicated, in connection with the zone 66, the distance d being the maximum distance that the carrier P must be from the object of interest C to perform the image acquisition. Alternatively, the distance remaining to be traveled by the carrier to come closer to the object of interest to take the image is indicated.

Furthermore, in order to further facilitate the understanding of the overall situation by the operator, in this embodiment, the validity of the picture taking conditions according to one acquisition mode is also shown by the situation of the spatial picture taking zones relative to the outer circle 65.

If the rings or ring portions corresponding to the spatial picture taking zones are situated at the outer circle 65, or pasted to rings/ring portions themselves situated at the outer circle 65, the distance between the carrier and the object of interest is sufficient.

Consequently, the representation of FIG. 3 indicates to an operator that the zones 66 are not reachable, and that it is necessary to bring the carrier P closer to the object of interest C in order to acquire images according to the second picture taking mode under nominal conditions.

Thus, the map 60 provides information that is useful and easy to grasp to assist the operator in steering the carrier P so as to reach a picture taking zone of sufficient quality making it possible to acquire images according to a given picture taking mode.

When the carrier P comes closer to the target object C, the map being updated in real-time, the position of the picture taking zones relative to the outer circle 65 or relative to the zones already pasted at the outer circle 65 is modified to indicate, if applicable, a sufficient distance for taking pictures.

The visual indication of the distance remaining to be traveled by the carrier is also modified, and it disappears when the carrier is at a sufficient distance from the object of interest.

The zones 68 correspond to a nominal picture taking quality by a third sensor of the radar type according to a third DRP picture taking mode.

As in the case of the second picture taking mode, the distance between the carrier P and the object of interest C and the relative orientation of the object of interest C with respect to the carrier P are taken into account to assess the picture taking quality level and the calculation of the zones 68.

Thus, in the example illustrated in FIG. 3, for this third picture taking mode, the distance between the carrier P and the object of interest C is sufficient, since the zones 68 are shown at the circle 65. Conversely, the orientation of the carrier is not satisfactory, the line of sight L not intercepting any of the regions 68. Consequently, the map 60 makes it possible to indicate to the operator that he must perform a maneuver to change trajectory in order to acquire images according to the third picture taking mode.

Lastly, FIG. 3 also illustrates a set of zones 70, 72, 74 corresponding to the acquisition of images according to a fourth picture taking mode, which is the FLIR mode.

In this mode, picture taking is technically possible irrespective of the orientation of the object of interest C relative to the carrier P, but it is, however, possible to calculate zones providing better quality in terms of information content by taking this orientation into account. Thus, zones 70 are distinguished with a higher picture taking quality, zones 72 with a nominal picture taking quality, and zones 74 with a deteriorated quality. In the example of the figure, if the object of interest C is a boat, the zones 74 correspond to a front or back picture, providing less information than a side picture.

Furthermore, for this fourth picture taking mode, the distance between the carrier P and the object of interest C is also taken into account to determine the feasibility of the picture taking. In the example shown in FIG. 3, according to the representation convention, the distance between the carrier P and the object of interest C is insufficient, the corresponding ring being at a distance from the ring comprising the zones 66.

Alternatively, the indication of sufficient distance between the carrier P and the object of interest C is displayed differently, for example by a choice of representation color of the picture taking zones depending on whether the distance is sufficient.

Figure 4:
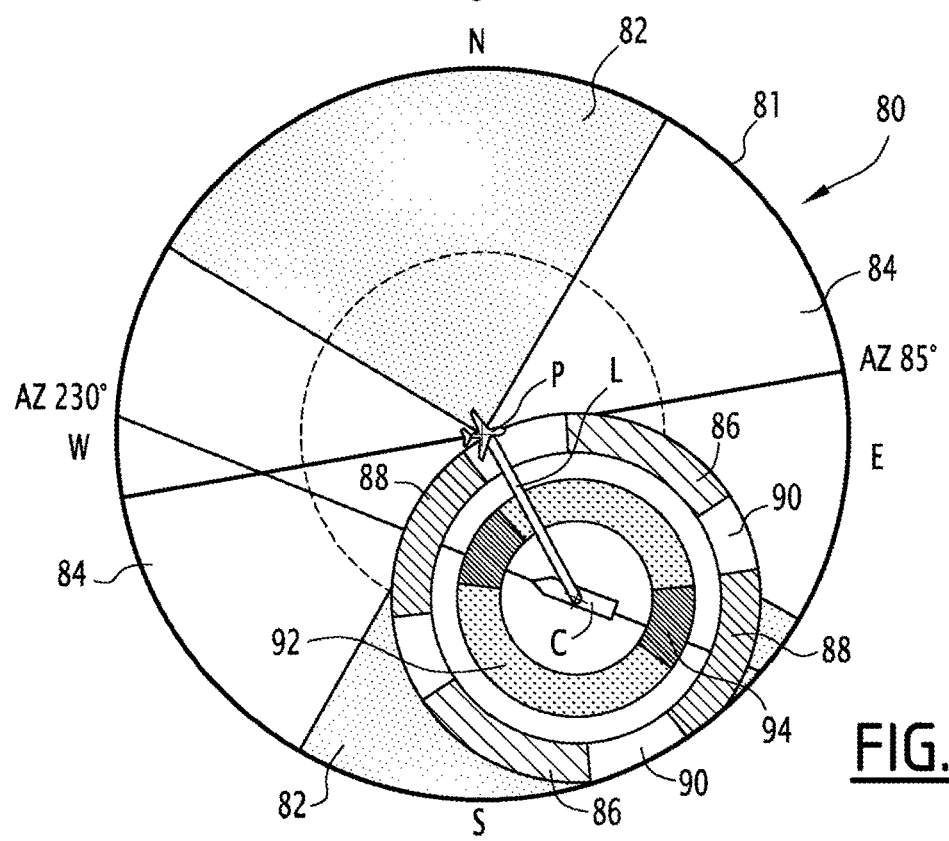
FIGS. 4 and 5 are illustrations of display views relative to a plurality of picture taking modes according to an alternative of the second embodiment of the invention.
Figure 5:
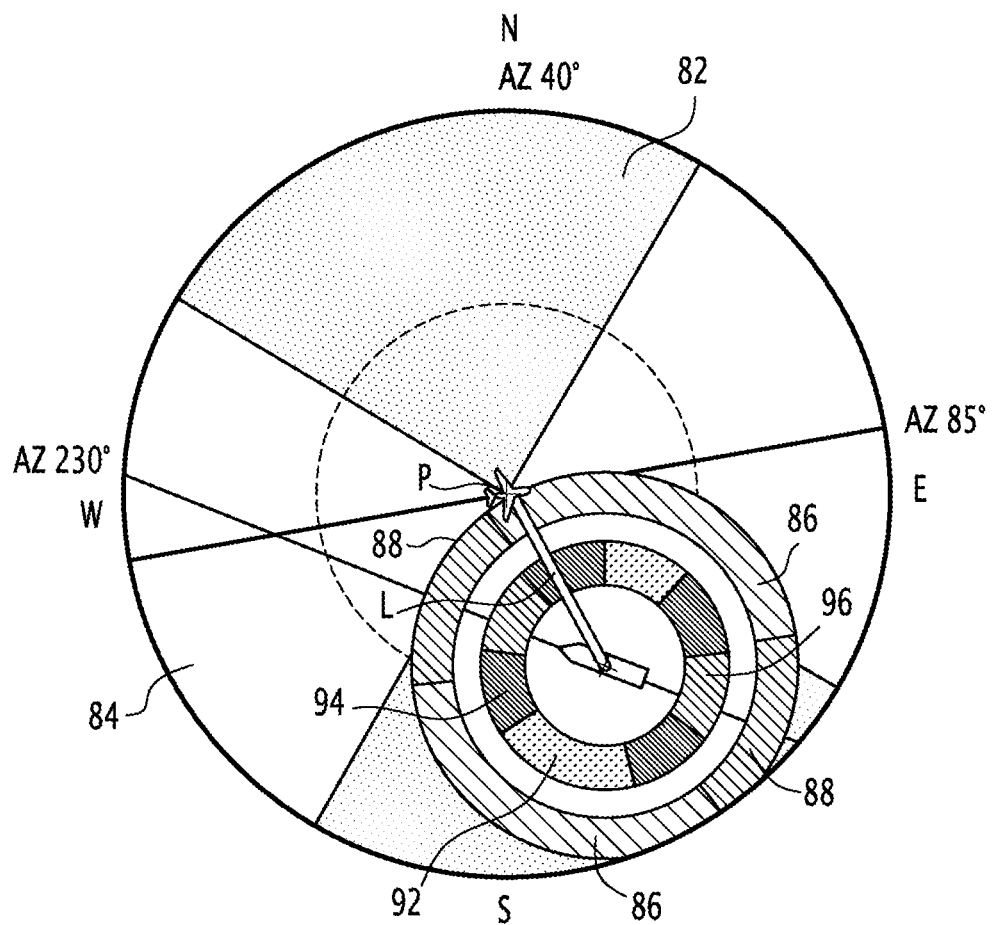

FIGS. 4 and 5 show alternative depictions of the map of the spatial picture taking zones, further taking into account outside environment conditions of the carrier in addition to relative and absolute position information of the carrier P and the object of interest C, for example weather conditions.

Thus, according to the embodiment illustrated in reference to FIGS. 4 and 5, the computing module 24 implements a map computation representing the picture taking quality of the different sensors at a given moment and taking weather conditions into account.

For example, when the object of interest C is a navigating boat, the "rough sea" or "calm sea" maritime conditions are also taken into account.

In a case similar to the case described in reference to FIG. 3, when four picture taking modes are considered, FIG. 4 illustrates the map 80 of the picture taking zones in case of "rough sea".

The map 80 shown in the perimeter 81, refreshed in real-time, shows the picture taking quality zones associated with the four picture taking modes, according to the environmental conditions.

The carrier P is at the center of the perimeter 81, and the object of interest C is situated at a distance D from the carrier P. The carrier P and the object of interest C are connected by a line of sight L. As in the example of FIG. 3, the cardinal points and the azimuth values of the respective trajectories of the carrier and the object of interest are indicated.

The zones 82, 84 correspond to the first picture taking mode. The zones 86 are the spatial zones of nominal quality of the second picture taking mode, and the zones 88 are the spatial zones of nominal quality of the third picture taking mode.

As illustrated in the figure, there are zones 90, corresponding to the position of the carrier P relative to the object of interest C, in which neither the second picture taking mode nor the third picture taking mode is applicable.

Regarding the fourth picture taking mode, the zones 92 and 94 respectively corresponding to a higher quality level and a nominal quality level are shown.

FIG. 5 illustrates the map of the picture taking zones corresponding to the same position of the carrier P and the object of interest C as in the example of FIG. 4, but in the case of a calm sea.

As shown in FIG. 5, in this case, the zones 86 and 88 come together, the zones 90 in which picture taking is impossible or strongly deteriorated having disappeared.

Furthermore, for the fourth picture taking mode, three types of spatial views 92, 94 and 96 are distinguished with higher, nominal and deteriorated quality levels, respectively.

Figure 6:
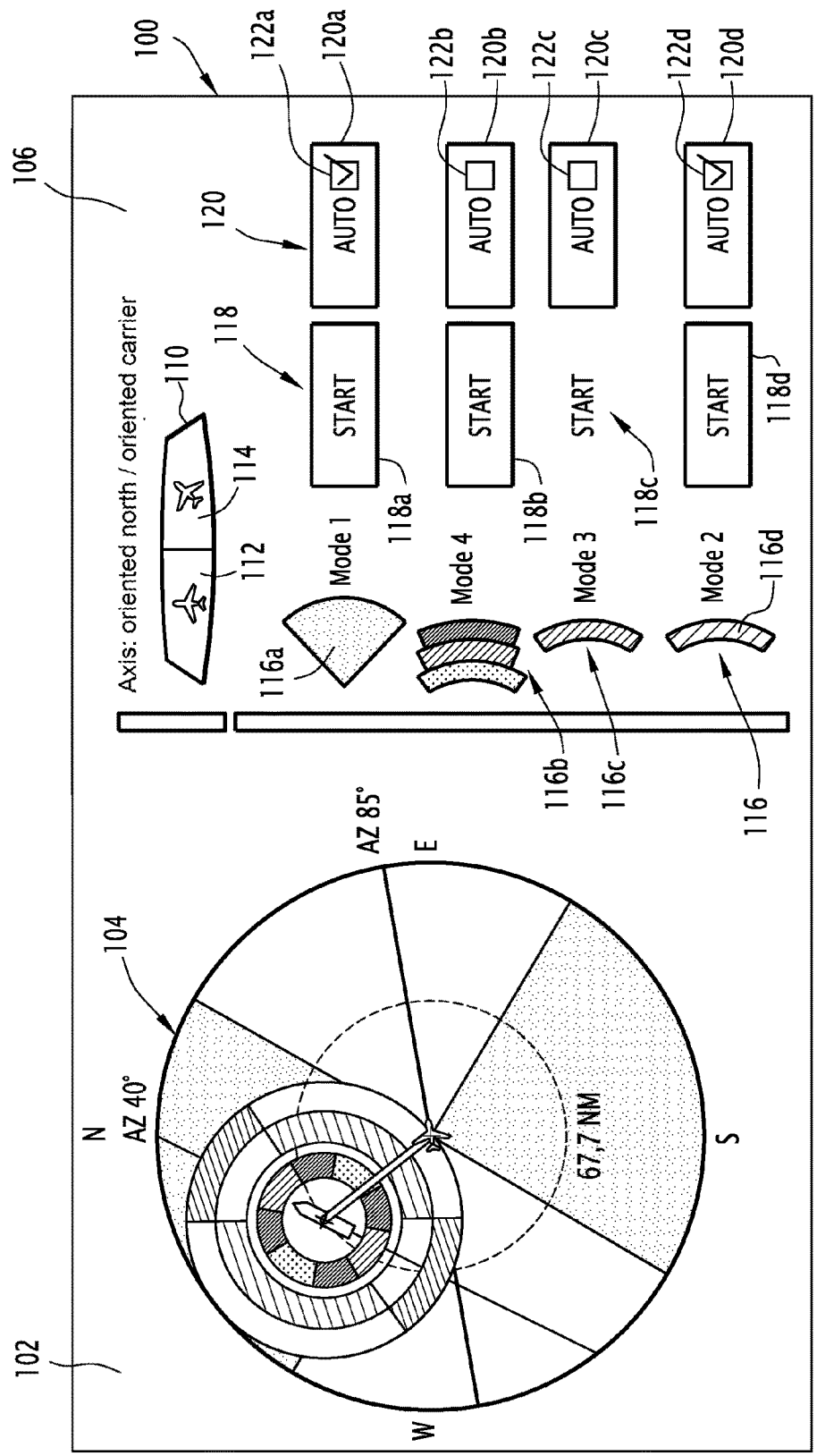
FIG. 6 shows an example of a complete man-machine interface according to one embodiment of the invention.

FIG. 6 illustrates an embodiment of a complete graphic interface 100 comprising, in its left portion 102, a map 104 of the picture taking quality zones corresponding to four picture taking modes, similar to the depictions illustrated in FIGS. 2 to 5.

In the right portion 106 of the graphic interface 100, a graphic information and control panel is displayed.

A graphic control object 110 makes it possible to modify the depiction orientation of the map 104, between a "North" orientation that can be selected using the control button 112 and a "carrier orientation" that can be selected using the control button 114.

A legend 116 indicates the relationships between the considered sensors/picture taking modes and the visual indicators 116a to 116d of quality spatial zones visible in the left portion 102.

A series 118 of operator picture taking control buttons and a series 120 of automatic picture taking control buttons are also present. Thus, the graphic interface 100 offers the possibility of controlling the picture taking, for each of the considered picture taking modes, manually via the buttons 118a to 118d or automatically via the buttons 120a to 120d.

In the embodiment illustrated in FIG. 6, the automatic control is optional and the choice of the option is made by activating one of the buttons 122a to 122d, through an appropriate pointing means.

Thus, in the illustration of FIG. 6, the picture taking modes 1 and 2 have been selected for automatic picture taking. In this case, when a spatial zone of nominal quality is reachable for one of these two picture taking modes, this mode is selected automatically for picture taking. When both picture taking modes are usable in nominal quality, the computing module 24 performs a comparison of the respective associated quality levels and selects the mode among these two picture taking modes that offers the best quality.

It should also be noted that the control button 118c cannot be activated, which is represented by a lack of frame in FIG. 6, because according to the map 104, the carrier P is in a position in which the third picture taking mode is not usable with a nominal picture taking quality.

Thus, advantageously, the operator benefits from a clear and global view of the picture taking quality associated with various sensors and available picture taking modes, as well as associated ergonomic control tools. The display of the map being refreshed in real-time, and distance and orientation indications being provided, it is easier for the operator to steer the carrier if necessary in order to obtain an acquisition of images of the object of interest that has a satisfactory quality level.

The invention has been described above for given picture taking sensors. It should be noted that the invention generally applies to any type of onboard radar or optronic sensors.

The invention has been described in one example application in which the sensor carrier is an aircraft and the object of interest is a ship. More generally, the invention applies in the entire air-surface imaging field, for any type of object of interest situated on the earth's surface, for example vehicles moving on the ground.

The invention claimed is:

1. An operator terminal of a mission system comprising at least one screen for displaying environmental data of a mobile carrier of a situation analysis system, said analysis system including at least one image sensor adapted to operate according to at least one picture taking mode and means for providing a real-time spatial position of at least one object of interest, comprising:
   a positioning module for obtaining at least one piece of position information representative of the position of the carrier and of the at least one object of interest,
   for at least one picture taking mode using a selected image sensor, a computing module able to provide at least two different picture taking quality zones associated to the picture taking mode of the selected image sensor, in a predetermined spatial perimeter centered on the position of the carrier, each picture taking quality zone having an associated quality level, and
   a display module for displaying a map of the picture taking quality zones relative to the position of the carrier, in the predetermined spatial perimeter,
   said positioning, computing and display modules being implemented to obtain a quasi-real-time refresh of said displayed map,
   wherein the image sensor(s) are able to acquire images according to a plurality of picture taking modes, and wherein the computing module is implemented to compute picture taking quality zones for each of the picture taking modes, and wherein the display module is able to display, on the same display screen, a map comprising all of the picture taking quality zones relative to each of said picture taking modes.

2. The operator terminal according to claim 1, adapted to display, for each picture taking mode, control zones for picture taking by the operator and control zones for automatic picture taking, selectable by the operator and displayed on the same display screen as said map.

3. The operator terminal according to claim 1, wherein the display module is further able to display a visual indication relative to the position of the carrier with respect to the relative position of the object of interest.

4. The operator terminal according to claim 1, wherein the computing module is able to determine at least one picture taking quality zone having a nominal quality level and at least one picture taking quality zone having a deteriorated quality level.

5. The operator terminal according to claim 1, wherein said map shows said object of interest at a constant distance from the carrier, and wherein the display module is able to display actual distance information between the carrier and the object of interest.

6. The operator terminal according to claim 5, wherein the display module is able to display a distance remaining to be traveled by the carrier to reach a nominal picture taking quality zone according to a predetermined acquisition mode.

7. The operator terminal according to claim 5, wherein the displayed picture taking quality zones are repositioned in the predetermined spatial perimeter substantially in real-time based on the actual distance and the relative orientations between the carrier and the object of interest.

8. The operator terminal according to claim 7, wherein the picture taking quality zones are displayed in the form of concentric ring portions, fitted in a circular perimeter centered on the object of interest and limited by an outer circle, and wherein the situation of the concentric rings relative to the outer circle indicates whether the carrier is situated at a sufficient distance from the object of interest to reach a corresponding quality zone.

9. The operator terminal according to claim 1, wherein the positioning module for obtaining at least one piece of position information allows obtaining a distance between the carrier and the object of interest and a relative rotation angle between the object of interest and the carrier.

10. The operator terminal according to claim 1, wherein the computing module takes outside environment conditions of the carrier or of the object of interest into account to determine the picture taking quality zones.

11. A mission system including at least one screen for displaying environmental data of a mobile carrier of a situation analysis system, said analysis system including at least one image sensor and means for providing a real-time spatial position of at least one object of interest, comprising an operator terminal according to claim 1.

* * * * *